US011229874B2

(12) United States Patent
Victory et al.

(10) Patent No.: US 11,229,874 B2
(45) Date of Patent: Jan. 25, 2022

(54) SYSTEMS AND METHODS FOR SELECTIVELY REMOVING HYDROGEN SULFIDE FROM A FEED GAS STREAM

(71) Applicants: Donald J. Victory, Sugar Lane, TX (US); Suhas P. Mondkar, Houston, TX (US); P. Scott Northrop, The Woodlands, TX (US); Jenny P. Seagraves, Spring, TX (US)

(72) Inventors: Donald J. Victory, Sugar Lane, TX (US); Suhas P. Mondkar, Houston, TX (US); P. Scott Northrop, The Woodlands, TX (US); Jenny P. Seagraves, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 287 days.

(21) Appl. No.: 16/454,107

(22) Filed: Jun. 27, 2019

(65) Prior Publication Data
US 2020/0023302 A1    Jan. 23, 2020

Related U.S. Application Data

(60) Provisional application No. 62/701,250, filed on Jul. 20, 2018.

(51) Int. Cl.
*B01D 53/14*  (2006.01)
*B01D 53/18*  (2006.01)
*C10L 3/10*   (2006.01)

(52) U.S. Cl.
CPC ..... *B01D 53/1468* (2013.01); *B01D 53/1425* (2013.01); *B01D 53/18* (2013.01); *C10L 3/103* (2013.01); *B01D 2257/304* (2013.01)

(58) Field of Classification Search
CPC ........ B01D 2252/103; B01D 2252/204; B01D 2256/24; B01D 2257/304;
(Continued)

(56) References Cited

U.S. PATENT DOCUMENTS 2,881,047 A    4/1959  Townsend
5,067,972 A *  11/1991  Hemmings ........ B01D 53/1425
                                                       95/173
(Continued)

FOREIGN PATENT DOCUMENTS

CN    106479578    5/2019
GB      750399     6/1956

*Primary Examiner* — Cabrena Holecek
(74) *Attorney, Agent, or Firm* — ExxonMobil Upstream Research Company—Law Department

(57) ABSTRACT

Systems and methods for selectively removing hydrogen sulfide from a feed gas stream. The systems include an absorber-heat exchanger (ABHEX) assembly configured to exchange thermal energy between a mixed stream and a thermal management fluid stream. The ABHEX assembly defines a mixed stream volume and a thermal management fluid stream volume. The ABHEX assembly includes an isolation structure that maintains fluid separation between the mixed stream and the thermal management fluid stream and facilitates thermal communication between the mixed stream and the thermal management fluid stream. The ABHEX assembly is configured to receive and to mix the feed gas stream and a lean solvent stream to generate the mixed stream, to separate the mixed stream into a product gas stream and a rich solvent stream, and to cool the mixed stream. The methods include methods of operating the systems.

21 Claims, 3 Drawing Sheets

(58) Field of Classification Search
CPC .......... B01D 2257/504; B01D 2259/65; B01D 2259/652; B01D 53/1418; B01D 53/1425; B01D 53/1468; B01D 53/18; C10L 2290/541; C10L 3/103; Y02C 20/40
See application file for complete search history.

(56) References Cited

U.S. PATENT DOCUMENTS

| | | | |
|---|---|---|---|
| 8,192,530 | B2 | 6/2012 | Handagama et al. |
| 8,361,424 | B2 | 1/2013 | Bouillon et al. |
| 2014/0331862 | A1* | 11/2014 | Cullinane ............... B01F 5/045 95/186 |

* cited by examiner

SYSTEMS AND METHODS FOR SELECTIVELY REMOVING HYDROGEN SULFIDE FROM A FEED GAS STREAM

CROSS REFERENCE TO RELATED APPLICATION

This application claims the priority benefit of U.S. Provisional Patent Application No. 62/701,250 filed Jul. 20, 2018, entitled SYSTEMS AND METHODS FOR SELECTIVELY REMOVING HYDROGEN SULFIDE FROM A FEED GAS STREAM.

FIELD OF THE DISCLOSURE

The present disclosure relates generally to systems and methods for selectively removing hydrogen sulfide from a feed gas stream, and more particularly to systems and methods that remove hydrogen sulfide from a feed gas stream that includes the hydrogen sulfide, carbon dioxide, and hydrocarbon gas.

BACKGROUND OF THE DISCLOSURE

Raw natural gas streams that are produced from subterranean formations may contain natural gas (e.g., primarily methane) and acidic impurities, such as carbon dioxide, hydrogen sulfide, mercaptans, and/or other trace sulfur compounds. It may be desirable to remove these acidic impurities prior to shipment, sale, and/or usage of the natural gas, such as by separating the acidic impurities from the natural gas. Several processes historically have been utilized to remove the acidic impurities; however, the equipment utilized to accomplish the necessary separation may be large, expensive to install, and/or expensive to operate, thereby decreasing an economic viability of acidic natural gas. Thus, there exists a need for improved systems and methods for selectively removing hydrogen sulfide from a feed gas stream.

SUMMARY OF THE DISCLOSURE

Systems and methods for selectively removing hydrogen sulfide from a feed gas stream. The systems include an absorber-heat exchanger (ABHEX) assembly configured to exchange thermal energy between a mixed stream and a thermal management fluid stream. The ABHEX assembly defines a mixed stream volume, which is configured to contain the mixed stream, and a thermal management fluid stream volume, which is configured to contain the thermal management fluid stream. The ABHEX assembly includes an isolation structure that maintains fluid separation between the mixed stream and the thermal management fluid stream and that facilitates thermal communication between the mixed stream and the thermal management fluid stream. The systems also include a feed gas supply conduit, which is configured to provide a feed gas stream to the mixed stream volume, a lean solvent supply conduit, which is configured to provide a lean solvent stream to the mixed stream volume, a product gas discharge conduit, which is configured to discharge a product gas stream from the mixed stream volume, and a rich solvent discharge conduit, which is configured to discharge a rich solvent stream from the mixed stream volume. The systems further include a thermal management fluid supply conduit, which is configured to provide the thermal management fluid stream to the thermal management fluid stream volume, and a thermal management fluid discharge conduit, which is configured to discharge the thermal management fluid stream from the thermal management fluid stream volume.

The ABHEX assembly is configured to receive and mix the feed gas stream and a lean solvent stream to generate the mixed stream within the mixed stream volume to facilitate absorption of hydrogen sulfide by the lean solvent stream and to generate the mixed stream. The ABHEX assembly also is configured to separate the mixed stream into the product gas stream and the rich solvent stream and to cool the mixed stream, via heat transfer with the thermal management fluid steam, to absorb thermal energy generated upon mixing of the feed gas stream and the lean solvent stream.

The methods include methods of operating the systems. The methods may include providing the feed gas stream and the lean solvent stream to the mixed stream volume that is defined by the ABHEX assembly and combining the feed stream and the lean solvent stream within the mixed stream volume to generate the mixed stream. The combining may include absorbing hydrogen sulfide from the feed gas stream with the hydrogen sulfide-absorbing solvent. The methods further may include providing the thermal management fluid stream that includes the thermal management fluid to the thermal management fluid stream volume defined by the ABHEX assembly, maintaining fluid separation within the ABHEX assembly between the mixed stream and the thermal management fluid stream, and separating the mixed stream into the product gas stream and the rich solvent stream. The methods may further include discharging the product gas stream and the rich solvent stream from the ABHEX assembly, and cooling the mixed stream within the ABHEX assembly with the thermal management fluid stream.

DETAILED DESCRIPTION AND BEST MODE OF THE DISCLOSURE

Figure 1:
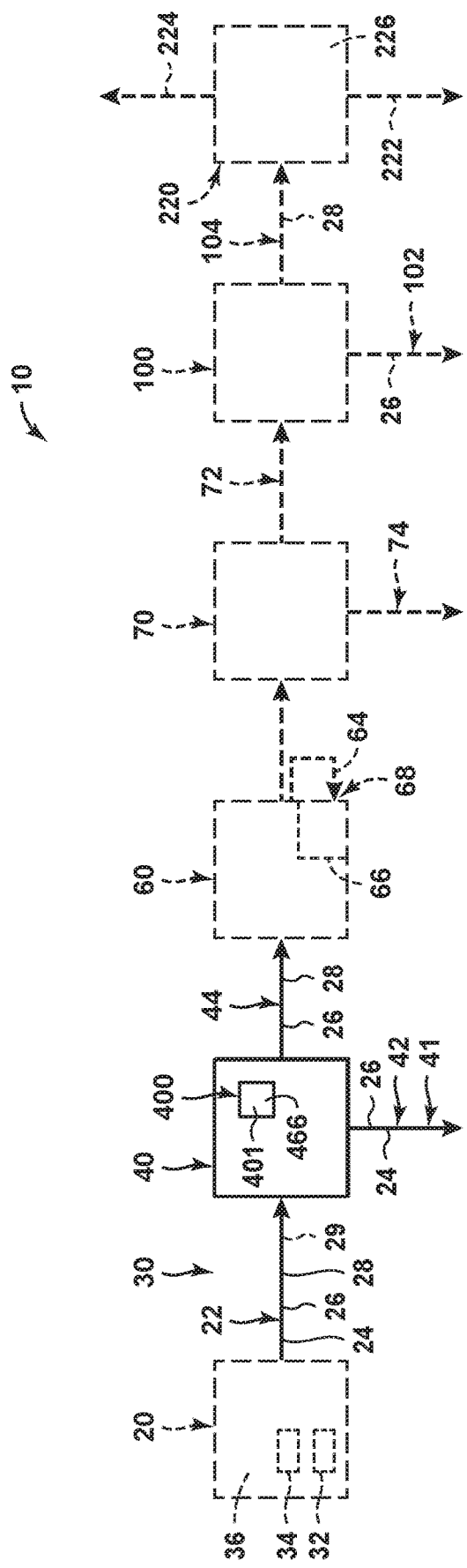
FIG. 1 is a schematic illustration of examples of hydrocarbon gas treatment systems that includes a selective hydrogen sulfide removal system, according to the present disclosure.
Figure 2:
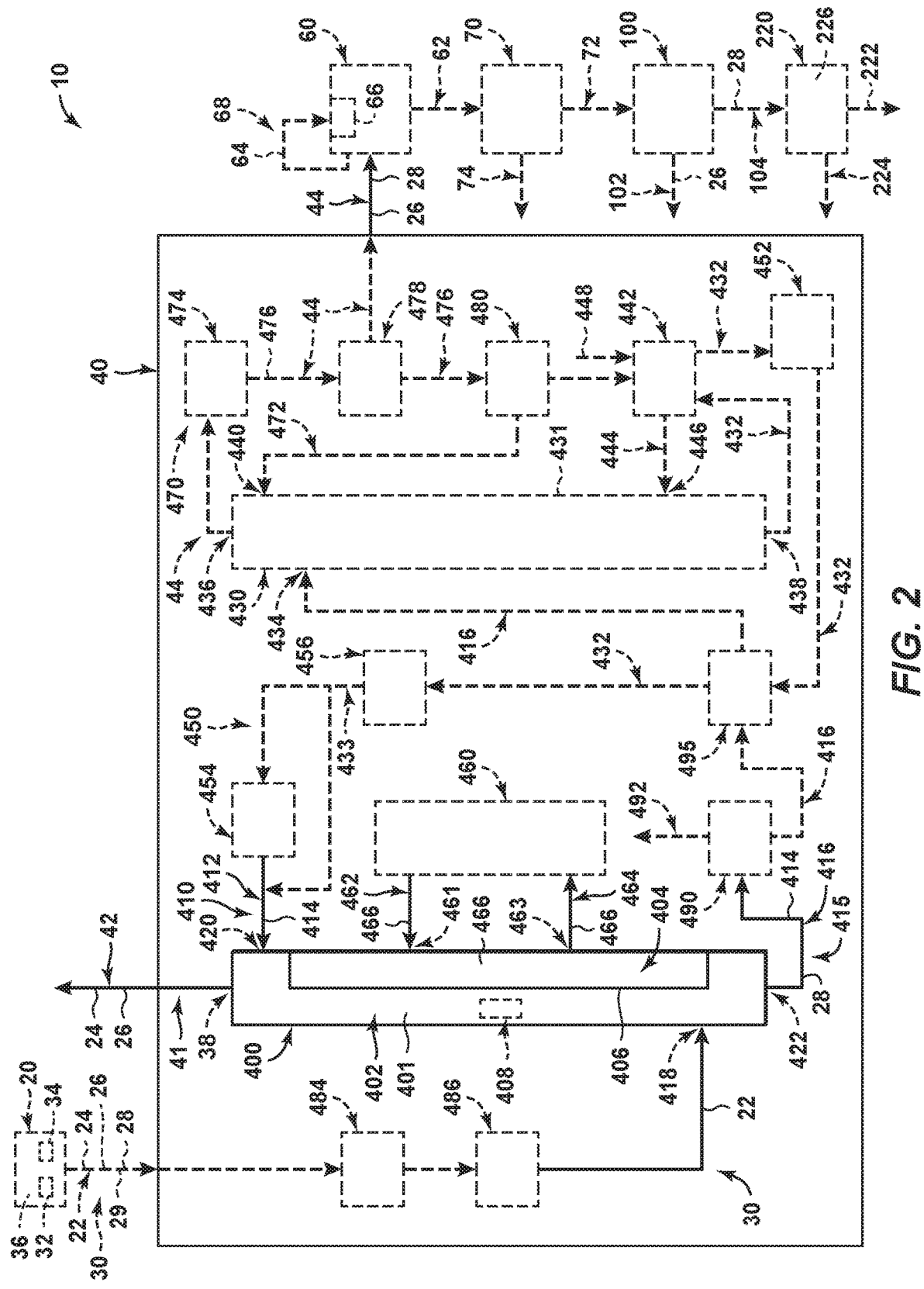
FIG. 2 is a more detailed schematic illustration of examples of a hydrocarbon gas treatment system that includes a selective hydrogen sulfide removal system, according to the present disclosure.
Figure 3:
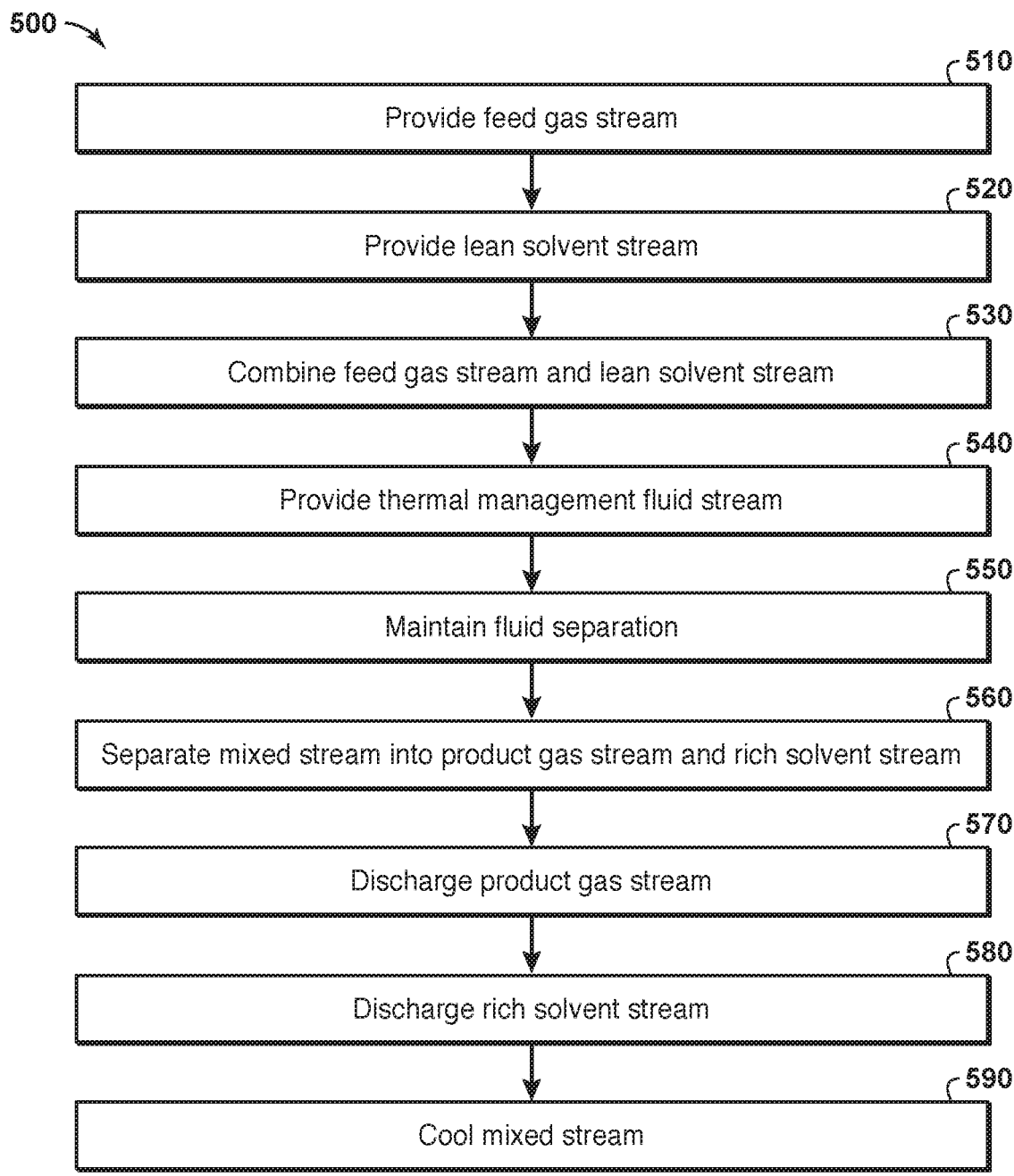
FIG. 3 is a flowchart depicting examples of methods, according to the present disclosure, for selectively removing hydrogen sulfide from a feed gas stream.

FIGS. 1-3 provide examples of hydrocarbon gas treatment systems 10, of selective hydrogen sulfide removal systems 40, and/or of methods 500, according to the present disclosure. Elements that serve a similar, or at least substantially similar, purpose are labeled with like numbers in each of FIGS. 1-3, and these elements may not be discussed in detail herein with reference to each of FIGS. 1-3. Similarly, all elements may not be labeled in each of FIGS. 1-3, but reference numerals associated therewith may be utilized herein for consistency. Elements, components, and/or features that are discussed herein with reference to one or more of FIGS. 1-3 may be included in and/or utilized with any of FIGS. 1-3 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 is a schematic illustration of examples of hydrocarbon gas treatment systems 10 that includes a selective hydrogen sulfide removal system 40, and FIG. 2 is a more detailed schematic illustration of examples of a hydrocarbon gas treatment system that includes a selective hydrogen sulfide removal system, according to the present disclosure. Selective hydrogen sulfide removal system 40 also may be referred to herein as a preferential hydrogen sulfide removal system 40, as a hydrogen sulfide removal system 40, as a removal system 40, and/or as a system 40. As discussed in more detail herein, selective hydrogen sulfide removal system 40 may be configured to selectively, discriminately, preferably, and/or preferentially absorb hydrogen sulfide over, or to a greater extent than, carbon dioxide.

As illustrated in FIGS. 1-2, hydrogen sulfide removal system 40 includes an absorber-heat exchanger (ABHEX) assembly 400. The ABHEX assembly is configured to exchange thermal energy between a mixed stream 401 and a thermal management fluid stream 466. As perhaps best illustrated in FIG. 2, ABHEX assembly 400 defines a mixed stream volume 402 configured to contain, house, at least temporarily retain, and/or surround mixed stream 401. ABHEX assembly 400 also defines a thermal management fluid stream volume 404 configured to contain, house, at least temporarily retain, and/or surround thermal management fluid stream 466. In addition, ABHEX assembly 400 includes an isolation structure 406 configured to maintain fluid separation between the mixed stream and the thermal management fluid stream and also to permit, to facilitate, and/or to encourage thermal communication between the mixed stream and the thermal management fluid stream.

Hydrogen sulfide removal systems 40 also include, or define, a feed gas supply conduit 30, a lean solvent supply conduit 410, a product gas discharge conduit 41, a rich solvent discharge conduit 415, a thermal management fluid supply conduit 462, and a thermal management fluid discharge conduit 464. Feed gas supply conduit 30 is configured to provide a feed gas stream 22 to mixed stream volume 402, such as via a feed gas inlet 418 of the ABHEX assembly. The feed gas stream includes hydrogen sulfide, carbon dioxide, and hydrocarbon gas, such as methane. The feed gas stream also may include other gasses, elements, and/or compounds. Lean solvent supply conduit 410 is configured to provide a lean solvent stream 412 to mixed stream volume 402, such as via a lean solvent inlet 420 of the ABHEX assembly. The lean solvent stream includes a hydrogen sulfide-absorbing solvent 414. Product gas discharge conduit 41 is configured to discharge a product gas stream 42 from the mixed stream volume, such as via a product gas outlet 38 of the ABHEX assembly. The product gas stream includes purified hydrocarbon gas and carbon dioxide that were provided to the mixed stream volume in the feed stream.

Rich solvent discharge conduit 415 is configured discharge a rich solvent stream 416 from the mixed stream volume, such as via a rich solvent outlet 422 of the ABHEX assembly. The rich solvent stream includes a substantial portion of hydrogen sulfide 28 that was provided to the mixed stream volume in the feed stream. The rich solvent stream also includes hydrogen sulfide-absorbing solvent 414.

Thermal management fluid supply conduit 462 is configured to provide thermal management fluid stream 466 to the thermal management fluid stream volume, such as via a thermal management fluid inlet 461 of the ABHEX assembly. Thermal management fluid discharge conduit 464 is configured to discharge thermal management fluid stream 466 from the thermal management fluid stream volume, such as via a thermal management fluid outlet 463 of the ABHEX assembly. The thermal management fluid stream includes, or is defined by, a thermal management fluid, examples of which are disclosed herein.

During operation of hydrogen sulfide removal system 40, feed gas stream 22, and lean solvent stream 412 may be provided to mixed stream volume 402 of ABHEX assembly 400 via feed gas supply conduit 30 and lean solvent supply conduit 410, respectively. The feed gas stream and the lean solvent stream then may mix, combine, and/or fluidly contact one another, within the mixed stream volume, to form and/or generate mixed stream 401. This mixing may produce, facilitate, and/or accomplish absorption, or selective absorption, of hydrogen sulfide 28 by lean solvent 412 and/or partitioning of at least a portion of the hydrogen sulfide into the lean solvent stream. Absorption of the hydrogen sulfide may transition the lean solvent stream into, or may generate, rich solvent stream 416. Subsequently, ABHEX assembly 400 may separate mixed stream 401 into product gas stream 42 and rich solvent stream 416, which may be discharged from the ABHEX assembly via product gas discharge conduit 41 and rich solvent discharge conduit 415, respectively.

At least partially concurrently with the above, thermal management fluid stream 466 may be provided to thermal management fluid stream volume 404 via thermal management fluid supply conduit 462 and may be discharged from the thermal management fluid stream volume via thermal management fluid discharge conduit 464. ABHEX assembly 400 may cool mixed stream 401, feed gas stream 22, lean solvent stream 412, product gas stream 42, and/or rich solvent stream 416 via heat transfer to thermal management fluid stream 466. This may include absorption of thermal energy generated upon mixing of the feed gas stream and the lean solvent stream (e.g., due to an exothermic heat of mixing and/or an exothermic heat of reaction between the feed gas stream and the lean solvent stream).

ABHEX assembly 400 may include any suitable structure that defines mixed stream volume 402, that defines thermal management fluid stream volume 404, and/or that includes isolation structure 406. Additionally or alternatively, ABHEX assembly 400 may include any suitable structure that receives and/or discharges any suitable process stream, examples of which include thermal management fluid stream 466, feed gas stream 22, lean solvent stream 412, product gas stream 42, and/or rich solvent stream 416.

In addition, ABHEX assembly 400 may be configured to maintain mixed stream 401 and/or any other stream that flows within the ABHEX assembly 400 within a target temperature range that extends between a minimum target temperature and a maximum target temperature. Examples of the minimum target temperature include temperatures of 0 degrees Celsius (° C.), 1° C., 2° C., 4° C., 6° C., 8° C., and/or 10° C. Examples of the maximum target temperature include temperatures of 24° C., 22° C., 20° C., 18° C., 16° C., 14° C., 12° C., and/or 10° C.

It is within the scope of the present disclosure that the process streams that are received by the ABHEX assembly, that are discharged from the ABHEX assembly, and/or that flow within the ABHEX assembly may have any suitable relative flow direction and/or flow orientation within the ABHEX assembly. As examples, the mixed stream may flow co-current, counter-current, and/or in cross-flow with the thermal management fluid stream. As additional examples, the feed gas stream may flow co-current and/or counter current with the hydrogen sulfide-absorbing solvent. As a more specific example, the feed gas stream may flow co-current with the hydrogen sulfide-absorbing solvent, while the feed stream and the hydrogen sulfide-absorbing solvent may flow counter-current with the thermal management fluid stream.

It is within the scope of the present disclosure that the ABHEX assembly 400 may have any suitable orientation relative to the horizontal and/or relative to the vertical. As an example, the mixed stream and/or the thermal management fluid stream may flow vertically, or at least substantially vertically, within the ABHEX assembly 400. As another example, the mixed stream and/or the thermal management fluid stream may flow horizontally, or at least substantially horizontally, within the ABHEX assembly 400.

The hydrogen sulfide-absorbing solvent may include and/or be a liquid solvent, or a liquid hydrogen sulfide-absorbing solvent. Under these conditions, the ABHEX assembly 400 may be configured such that the liquid solvent gravity flows through the ABHEX assembly 400. Additionally or alternatively, the ABHEX assembly 400 may include a liquid-supporting surface and may be configured such that the liquid solvent flows along the liquid-supporting surface. As an example, the ABHEX assembly 400 may include a plurality of tubes, and the liquid solvent may flow along inner walls of the plurality of tubes. This flow along the liquid-supporting surface may be laminar, may be at least substantially laminar, and/or may have less than a threshold Reynolds Number. Examples of the threshold Reynolds Number include 2100, 2000, 1800, 1600, 1400, and/or 1200.

It is within the scope of the present disclosure that the ABHEX assembly 400 may be configured such that the feed gas stream turbulently flows within the mixed stream volume and/or has at least a threshold Reynolds Number. Examples of the threshold Reynolds Number include 2100, 2200, 2400, 2600, 2800, and/or 3000. As an example, the ABHEX assembly 400 may include at least one turbulator 408 configured to induce turbulent flow within the feed gas stream as the feed gas stream flows within the mixed stream volume. When the ABHEX assembly 400 includes the plurality of tubes, the at least one turbulator may be positioned within the plurality of tubes.

Maintaining laminar flow of the liquid solvent and turbulent flow of the feed gas stream may increase and/or improve selectivity of hydrogen sulfide absorption by the hydrogen sulfide-absorbing solvent relative to absorption of carbon dioxide by the hydrogen sulfide-absorbing solvent. Stated another way, maintaining laminar flow of the liquid solvent and turbulent flow of the gas stream may cause the liquid solvent to preferentially absorb hydrogen sulfide over carbon dioxide, may cause the liquid solvent to absorb hydrogen sulfide to a greater extent than absorption of carbon dioxide by the liquid solvent, and/or may increase a ratio of hydrogen sulfide absorption to carbon dioxide absorption by the liquid solvent. This may decrease an amount of carbon dioxide in rich solvent stream 416 that is discharged from the ABHEX assembly 400, thereby decreasing a size, or a necessary size, for downstream components of hydrocarbon gas treatment systems 10 that include ABHEX assemblies 400, according to the present disclosure.

As an example, hydrogen sulfide absorption into the hydrogen sulfide-absorbing solvent may be nearly instantaneous once the hydrogen sulfide contacts the hydrogen sulfide-absorbing solvent. Thus, hydrogen sulfide absorption may be rate-limited by mass transfer within the feed gas stream, or in the gaseous phase. As such, turbulent flow within the gas phase may increase a rate of hydrogen sulfide absorption. In contrast, carbon dioxide absorption into the hydrogen sulfide-absorbing solvent may be slower and/or may be rate-limited by a concentration of carbon dioxide within the hydrogen sulfide-absorbing solvent and at the gas-liquid interface. As such, laminar flow within the liquid phase may decrease a rate of carbon dioxide absorption.

In one example, the ABHEX assembly 400 may include and/or be a shell and tube heat exchanger that defines a shell side and a tube side. Under these conditions, the shell side may define thermal management fluid stream volume 404, and the tube side may define mixed stream volume 402.

As illustrated in dashed lines in FIG. 2, hydrogen sulfide removal system 40 may include a feed gas stream cooling assembly 484. Feed gas stream cooling assembly 484, when present, may be configured to cool feed gas stream 22 to a feed gas stream temperature prior to supply of the feed gas stream to ABHEX assembly 400. Examples of the feed gas stream temperature include temperatures that are greater than a hydrate temperature of the feed gas stream, temperatures that are within 2° C. of the hydrate temperature of the feed gas stream, temperatures that are within 4° C. of the hydrate temperature of the feed gas stream, temperatures that are within 6° C. of the hydrate temperature of the feed gas stream, temperatures that are within 8° C. of the hydrate temperature of the feed gas stream, temperatures that are within 10° C. of the hydrate temperature of the feed gas stream, and/or temperatures that are within 15° C. of the hydrate temperature of the feed gas stream. Examples of feed gas stream cooling assembly 484 include any suitable heat exchanger, cooling tower, and/or direct expansion system.

As also illustrated in dashed lines in FIG. 2, hydrogen sulfide removal system 40 further may include a water separation assembly 486. Water separation assembly 486, when present, may be configured to remove liquid water from feed gas stream 22 prior to supply of the feed gas stream to ABHEX assembly 400. An example of water separation assembly 486 includes a water knockout assembly.

FIG. 2 also illustrates, in dashed lines, that hydrogen sulfide removal system 40 may include a thermal management fluid supply system 460. Thermal management fluid supply system 460, when present, may be configured to provide thermal management fluid stream 466 to ABHEX assembly 400 at a thermal management fluid stream supply temperature and/or to maintain the temperature of thermal management fluid stream 466 that is supplied to ABHEX assembly 400 at, or near, the thermal management fluid stream supply temperature. Thermal management fluid supply system 460 also may be configured to receive thermal management fluid stream 466 from ABHEX assembly 400 at a thermal management fluid stream return temperature. Stated another way, thermal management fluid supply system 460 may be configured to circulate thermal management fluid stream 466 in a closed loop.

This receipt of the thermal management fluid stream may be subsequent to flow of the thermal management fluid stream through thermal management fluid stream volume 404 and/or subsequent to mixed stream 401 being cooled by the thermal management fluid stream. As such, the thermal management fluid stream return temperature may be greater than the thermal management fluid stream supply temperature.

Thermal management fluid supply system 460 may be configured to regulate the thermal management fluid supply temperature to maintain a mixed stream temperature of the mixed stream between a minimum mixed stream temperature and a maximum mixed stream temperature. Examples of the minimum mixed stream temperature include temperatures of at least 0° C., at least 2° C., at least 4° C., at least 6° C., at least 8° C., and/or at least 10° C. Examples of the maximum mixed stream temperature include temperatures of at most 20° C., at most 18° C., at most 16° C., at most 14° C., at most 12° C., and/or at most 10° C.

Thermal management fluid supply system 460 may include any suitable structure that may provide thermal management fluid stream 466 to ABHEX assembly 400 and/or that may regulate the thermal management fluid stream supply temperature. As examples, thermal management fluid supply system 460 may include a valve, a pump, a compressor, a fluid conduit, a cooling tower, a direct expansion cooling assembly, an evaporative cooling assembly, and/or a source, or a reservoir, of thermal management fluid that defines the thermal management fluid stream.

Hydrogen sulfide removal system 40 also may include a solvent regeneration assembly 430. The solvent regeneration assembly may be configured to receive rich solvent stream 416 and/or to separate hydrogen sulfide 28 from the rich solvent stream to generate an acid gas stream 44 and a lean solvent recycle stream 432. Acid gas stream 44 may include a substantial fraction of the hydrogen sulfide from the rich solvent stream, while lean solvent recycle stream 432 may include a substantial fraction of the hydrogen sulfide-absorbing solvent from the rich solvent stream. Subsequently, a solvent recirculation assembly 450 may be utilized to provide lean solvent recycle stream 432 to ABHEX assembly 400 as lean solvent stream 412.

Acid gas stream 44 may include and/or define any suitable temperature, pressure, and/or flow rate. As examples, acid gas stream 44 may have and/or define a flow rate of at least 100,000 standard cubic meters per day (SCM/Day), at least 150,000 SCM/Day, at least 200,000 SCM/Day, at least 250,000 SCM/Day, at least 300,000 SCM/Day, at least 400,000 SCM/Day, and/or at least 500,000 SCM/Day. As additional examples, acid gas stream 44 may have and/or define a pressure of at least 40 kilopascals gauge pressure (kPag), at least 50 kPag, at least 55 kPag, at least 60 kPag, at least 65 kPag, at least 70 kPag, at least 75 kPag, and/or at least 80 kPag. As further examples, acid gas stream 44 may have and/or define a pressure of at most 160 kPag, at most 150 kPag, at most 140 kPag, at most 130 kPag, at most 120 kPag, at most 110 kPag, and/or at most 100 kPag.

As additional examples, the acid gas stream temperature of acid gas stream 44 may be at least 40° C., at least 41° C., at least 42° C., at least 43° C., at least 44° C., at least 45° C., and/or at least 46° C. As further examples, the acid gas stream temperature may be at most 50° C., at most 49° C., at most 48° C., at most 47° C., at most 46° C., and/or at most 45° C.

An example of solvent regeneration assembly 430 includes a stripping vessel 431. Solvent regeneration assembly 430 may be configured to receive rich solvent stream 416, such as via a rich solvent inlet 434 of stripping vessel 431. Solvent regeneration assembly 430 may separate hydrogen sulfide from the rich solvent stream, thereby generating acid gas stream 44 and lean solvent recycle stream 432. Acid gas stream 44 may be produced and/or discharged from the stripping vessel via an acid gas outlet 436, and lean solvent recycle stream 432 may be produced and/or discharged from the stripping vessel via a recycled solvent outlet 438.

As illustrated in dashed lines in FIG. 2, solvent regeneration assembly 430 further may include a reboiler assembly 442. Reboiler assembly 442, when present, may be configured to receive lean solvent recycle stream 432 from the stripping vessel 431 and to vaporize at least a portion of the lean solvent recycle stream to produce and/or generate a vaporized solvent return stream 444. The vaporization of the portion of the lean solvent recycle stream may be accomplished via combustion of a fuel stream and/or via thermal contact with a heat stream 448. Stripping vessel 431 may include a vaporized solvent return stream inlet 446 configured to receive at least a portion of vaporized solvent return stream 444.

As also illustrated in dashed lines in FIG. 2, solvent regeneration assembly 430 may include a reflux system 470. Reflux system 470, when present, may be configured to return at least a portion of acid gas stream 44 to stripping vessel 431 as a reflux stream 472, and stripping vessel 431 may include a reflux inlet 440 configured to receive the reflux stream.

Reflux system 470, when present, may include a condenser 474, a reflux accumulator 478, and/or a reflux pump 480. Condenser 474 may be configured to condense moisture from acid gas stream 44 and to produce and/or generate a condensed water stream 476. Reflux accumulator 478 may be configured to accumulate at least a portion of the condensed water stream. Reflux pump 480 may be configured to return the portion of the condensed water stream to stripping vessel 431 as reflux stream 472.

Solvent recirculation assembly 450 may be configured to receive lean solvent recycle stream 432, such as from recycled solvent outlet 438, and to provide the lean solvent recycle stream to ABHEX assembly 400 as, or as at least a portion of, lean solvent stream 412. As illustrated in dashed lines in FIG. 2, solvent recirculation assembly 450 may include a circulation pump 452. Circulation pump 452, when present, may be configured to convey lean solvent recycle stream 432 from solvent regeneration assembly 430 to and/or toward ABHEX assembly 400 as lean solvent stream 412.

As also illustrated in dashed lines in FIG. 2, solvent recirculation assembly 450 may include a rich/lean heat exchanger 495. Rich/lean heat exchanger 495 may be configured to exchange thermal energy between rich solvent stream 416 and lean solvent recycle stream 432, such as to cool the lean solvent recycle stream and/or to heat the rich solvent stream.

As also illustrated in dashed lines in FIG. 2, solvent recirculation assembly 450 may include a lean solvent cooling assembly 456. Lean solvent cooling assembly 456 may be configured to cool lean solvent recycle stream 432 to generate a cooled lean solvent recycle stream 433. Cooled lean solvent recycle stream 433 then may be provided to ABHEX assembly 400 as, or as at least a portion of, lean solvent stream 412.

As discussed, lean solvent cooling assembly 456 may be configured to cool lean solvent recycle stream 432 to generate cooled lean solvent recycle stream 433. In the systems and methods disclosed herein, an efficiency and/or selectivity of hydrogen sulfide absorption, by lean solvent stream 412 and within ABHEX assembly 400, may be improved, or increased, by the presence of lean solvent cooling assembly 456 when compared to otherwise identical hydrogen sulfide removal systems that do not include the lean solvent cooling assembly and/or that do not cool a corresponding lean solvent stream to the extent that lean solvent cooling assembly 456 cools lean solvent recycle stream 432. In addition, cooling of lean solvent recycle stream 432 by lean solvent cooling assembly 456 may operate in cooperation with cooling of feed gas stream 22 by feed gas stream cooling assembly 484 to further improve the overall efficiency of hydrogen sulfide adsorption within ABHEX assembly 400.

With the above in mind, a cooled lean solvent recycle stream temperature of cooled lean solvent recycle stream 433 may be less than a lean solvent recycle stream temperature of lean solvent recycle stream 432. Stated another way, the cooled lean solvent recycle stream temperature may be at least a threshold recycle stream temperature differential below the lean solvent recycle stream temperature. Stated yet another way, lean solvent cooling assembly 456 may be configured to decrease the lean solvent recycle stream temperature by at least the threshold recycle stream temperature differential to produce and/or generate the cooled lean solvent recycle stream. Examples of the threshold recycle stream temperature differential include threshold temperature differentials of 10° C., 15° C., 20° C., 25° C., 30° C., and/or 35° C.

Examples of the cooled lean solvent recycle stream temperature include temperatures of at most 2° C., at most 4° C., at most 6° C., at most 8° C., at most 10° C., at most 12° C., at most 14° C., at most 15° C., at most 16° C., at most 18° C., and/or at most 20° C. Additional examples of the cooled lean solvent recycle stream temperature include temperatures of at least 0° C., at least 2° C., at least 4° C., at least 6° C., at least 8° C., and/or at least 10° C.

The cooled lean solvent recycle stream temperature may be selected based, at least in part, on the cooled acid gas stream temperature. As an example, the cooled lean solvent recycle stream temperature may be equal, or at least substantially equal, to the cooled acid gas stream temperature. As another example, the cooled lean solvent recycle stream temperature may be within a threshold stream temperature difference of the cooled acid gas stream temperature. Examples of the threshold stream temperature difference include temperature differences of less than 1° C., less than 2° C., less than 4° C., less than 6° C., less than 8° C., and/or less than 10° C.

Lean solvent cooling assembly 456 may include any suitable structure that may be adapted, configured, designed, and/or constructed to cool lean solvent recycle stream 432 to produce and/or generate cooled lean solvent recycle stream 433. As examples, lean solvent cooling assembly 456 may include a heat exchanger, a cooling tower, and/or a refrigeration assembly.

As also illustrated in dashed lines in FIG. 2, solvent recirculation assembly 450 further may include a filter 454. Filter 454, when present, may be configured to remove particulate material from at least a portion of lean solvent recycle stream 432 prior to supply of the lean solvent recycle stream to ABHEX assembly 400 as lean solvent stream 412.

As also illustrated in dashed lines in FIG. 2, hydrogen sulfide removal system 40 may include a flash vessel 490. Flash vessel 490, when present, may be configured to vaporize a portion of rich solvent stream 416 that is discharged from ABHEX assembly 400 to generate a vaporized rich solvent stream 492. When hydrogen sulfide removal system 40 includes flash vessel 490, vaporized rich solvent stream 492 may be separated from a remainder of rich solvent stream 416, which may be supplied to solvent regeneration assembly 450.

Product gas stream 42 may include and/or define any suitable composition, or chemical composition. As examples, product gas stream 42 may include at least 50 weight percent (wt %) of the hydrocarbon gas from the feed gas stream, at least 60 wt % of the hydrocarbon gas from the feed gas stream, at least 70 wt % of the hydrocarbon gas from the feed gas stream, at least 80 wt % of the hydrocarbon gas from the feed gas stream, at least 90 wt % of the hydrocarbon gas from the feed gas stream, at least 95 wt % of the hydrocarbon gas from the feed gas stream, and/or at least 99 wt % of the hydrocarbon gas from the feed gas stream. As additional examples, product gas stream 42 may include at least 40 wt % hydrocarbon gas, at least 50 wt % hydrocarbon gas, at least 60 wt % hydrocarbon gas, at least 70 wt % hydrocarbon gas, at least 80 wt % hydrocarbon gas, and/or at least 90 wt % hydrocarbon gas.

As further examples, the product gas stream may include at most 100 parts per million (ppm) hydrogen sulfide, at most 90 ppm hydrogen sulfide, at most 80 ppm hydrogen sulfide, at most 70 ppm hydrogen sulfide, at most 60 ppm hydrogen sulfide, at most 50 ppm hydrogen sulfide, at most 40 ppm hydrogen sulfide, at most 30 ppm hydrogen sulfide, at most 20 ppm hydrogen sulfide, at most 10 ppm hydrogen sulfide, at most 8 ppm hydrogen sulfide, at most 6 ppm hydrogen sulfide, at most 4 ppm hydrogen sulfide, and/or at most 2 ppm hydrogen sulfide.

As yet another example, the product gas stream may include carbon dioxide and/or a major fraction of the carbon dioxide from the feed gas stream. As examples, the product gas stream may include at least 50 wt % of the carbon dioxide from the feed gas stream, at least 60 wt % of the carbon dioxide from the feed gas stream, at least 70 wt % of the carbon dioxide from the feed gas stream, at least 80 wt % of the carbon dioxide from the feed gas stream, and/or at least 90 wt % of the carbon dioxide from the feed gas stream.

Feed gas stream 22 may include and/or define any suitable composition, or chemical composition. As an example, feed gas stream 22 may include and/or be a natural gas stream, such as may be produced and/or generated by a hydrocarbon well 36. The natural gas may include hydrocarbon gas 24, such as methane, as well as carbon dioxide 26, hydrogen sulfide 28, and/or other components 29, such as mercaptans and/or other sulfur-containing compounds.

As discussed, lean solvent stream 412 may include, may consist of, and/or may consist essentially of the hydrogen sulfide-absorbing solvent 414. The hydrogen sulfide-absorbing solvent may include and/or define any suitable composition, or chemical composition. As examples, hydrogen sulfide-absorbing solvent 414 may include an amine solution, a tertiary amine solution, a sterically hindered amine solution, diethanol amine, and/or ethanol-ethoxy tert-butyl amine. As another example, hydrogen sulfide-absorbing solvent 414 may include water. The hydrogen sulfide-absorbing solvent may absorb hydrogen sulfide at a hydrogen sulfide absorption rate and may absorb carbon dioxide at a carbon dioxide absorption rate that is less than the hydrogen sulfide absorption rate.

Lean solvent stream 412 may have and/or define any suitable lean solvent stream temperature as the lean solvent stream is supplied to ABHEX assembly 400. As an example, the lean solvent stream temperature may be greater than the feed gas stream temperature of feed gas stream 22. As more specific examples, the lean solvent stream temperature may be at least 1° C., at least 2° C., at least 3° C., at least 4° C., and/or at least 5° C. greater than the feed gas stream temperature.

Rich solvent stream 416 may include a major fraction of hydrogen sulfide 28 from feed gas stream 22 and/or a minor fraction of carbon dioxide 26 from the feed gas stream. As examples, the rich solvent stream may include at least 50 wt % of the hydrogen sulfide from the feed gas stream, at least 60 wt % of the hydrogen sulfide from the feed gas stream, at least 70 wt % of the hydrogen sulfide from the feed gas stream, at least 80 wt % of the hydrogen sulfide from the feed gas stream, and/or at least 90 wt % of the hydrogen sulfide from the feed gas stream. Additionally or alternatively, the rich solvent stream may include at most 50 wt %, at most 40 wt %, at most 30 wt %, at most 20 wt %, at most 10 wt %, and/or at most 5 wt % of the carbon dioxide from the feed gas stream.

As discussed, hydrogen sulfide removal system 40 may be included in and/or may form a portion of a hydrocarbon gas treatment system 10. In addition to hydrogen sulfide removal system 40, hydrocarbon gas treatment systems 10 also include a feed gas supply system 20 and an acid gas enrichment system 100.

Feed gas supply system 20 is configured to provide feed gas stream 22 to feed gas supply conduit 30 and/or to hydrogen sulfide removal system 40. Feed gas supply system 20 may include any suitable structure that may be adapted, configured, designed, and/or constructed to produce, to generate, and/or to provide feed gas stream 22. As an example, feed gas system 20 may include a feed gas supply compressor 32 configured to provide a motive force for flow of feed gas supply stream 22 to hydrogen sulfide removal system 40. As another example, feed gas supply system 20 may include a feed gas supply control valve 34 configured to control a flow rate of feed gas stream 22 that is supplied to hydrogen sulfide removal system 40. As another example, feed gas supply system 20 may include hydrocarbon well 36, which is configured to produce and/or generate feed gas stream 22.

Acid gas enrichment system 100 is configured to receive acid gas stream 44 from hydrogen sulfide removal system 40 and to separate the acid gas stream into a treated gas stream 102 and an enriched acid gas stream 104. Treated gas stream 102 includes a substantial portion of carbon dioxide 26 from acid gas stream 44, and enriched acid gas stream 104 includes a substantial portion of hydrogen sulfide 28 from the acid gas stream.

Acid gas enrichment system 100 also may include a heat exchanger 60. Heat exchanger 60, when present, may be configured to receive acid gas stream 44 from hydrogen sulfide removal system 40, to cool the acid gas stream to generate a cooled acid gas stream 62, and to provide the cooled acid gas stream to acid gas enrichment system 100.

In the systems and methods disclosed herein, an efficiency of separation of the acid gas stream into treated gas stream 102 and enriched acid gas stream 104 may be improved, or increased, by the presence of heat exchanger 60 when compared to otherwise identical hydrocarbon gas treatment systems that do not include heat exchanger 60.

With the above in mind, a cooled acid gas stream temperature of cooled acid gas stream 62 may be less than an acid gas stream temperature of acid gas stream 44. Stated another way, the cooled acid gas stream temperature may be at least a threshold acid gas stream temperature differential below the acid gas stream temperature. Stated yet another way, heat exchanger 60 may be configured to decrease the acid gas stream temperature by at least the threshold acid gas stream temperature differential to produce and/or generate the cooled acid gas stream. Examples of the threshold acid gas stream temperature differential include threshold temperature differentials of 10° C., 15° C., 20° C., 25° C., 30° C., and/or 35° C.

Examples of the cooled acid gas stream temperature include temperatures of at most 2 degrees Celsius, at most 4° C., at most 6° C., at most 8° C., at most 10° C., at most 12° C., at most 14° C., at most 15° C., at most 16° C., at most 18° C., and/or at most 20° C. Additional examples of the cooled acid gas stream temperature include temperatures of at least 0° C., at least 2° C., at least 4° C., at least 6° C., at least 8° C., and/or at least 10° C.

Heat exchanger 60 may include any suitable structure that may be adapted, configured, designed, and/or constructed to receive acid gas stream 44 and to cool the acid gas stream to produce and/or generate cooled acid gas stream 62. As an example, heat exchanger 60 may be configured to transfer thermal energy from acid gas stream 62 to a thermal management fluid stream 64 to generate the cooled acid gas stream. Under these conditions, heat exchanger 60 also may be configured to maintain fluid separation, or isolation, between the acid gas stream and the thermal management fluid stream. Examples of thermal management fluid stream 64 include a gas stream, an air stream, a liquid stream, a water stream, a seawater stream, and/or a refrigerant stream.

As illustrated in dashed lines in FIGS. 1-2, hydrocarbon gas treatment system 10 and/or heat exchanger 60 thereof also may include a cooling assembly 66. Cooling assembly 66, when present, may be configured to cool thermal management fluid stream 64 prior to thermal contact between the thermal management fluid stream and acid gas stream 44. Examples of cooling assembly 66 include a cooling tower, an evaporation unit, a refrigeration unit, and/or a direct expansion cooling assembly.

It is within the scope of the present disclosure that hydrocarbon gas treatment system 10 may be configured to receive thermal management fluid stream 64, to facilitate thermal contact between the thermal management fluid stream and the acid gas stream, and subsequently to discharge the thermal management fluid stream. The thermal management fluid stream may be received from a reservoir, or source, of the thermal management fluid and discharged back to the reservoir, or source. Additionally or alternatively, it is also within the scope of the present disclosure that hydrocarbon gas treatment system 10 thereof may include a closed loop thermal management fluid supply system 68, which may be configured to circulate thermal management fluid stream 64 in a closed loop that includes the heat exchanger.

As illustrated in dashed lines in FIGS. 1-2, hydrocarbon gas treatment system 10 also may include a water removal assembly 70. Water removal assembly 70, when present, may be configured to remove, or to separate, liquid water from cooled acid gas stream 62 and to produce and/or generate a water stream, or a liquid water stream 74, and a dewatered cooled acid gas stream 72. When system 10 includes water removal assembly 70, dewatered cooled acid gas stream 72 may be received by acid gas enrichment system 100 as the portion of cooled acid gas stream 62. An example of water removal assembly 70 includes a water knockout assembly.

As illustrated in dashed lines in FIGS. 1-2, hydrocarbon gas treatment system 10 may include and/or may be in fluid communication with a sulfur recovery unit 220. Sulfur recovery unit 220, when present, may be configured to receive enriched acid gas stream 104 from acid gas enrichment system 100 and to generate an elemental sulfur stream 222 and a tail gas stream 224 from the enriched acid gas stream. As also illustrated in dashed lines in FIG. 2, sulfur recovery unit 220 may include a tail gas treatment assembly 226, which may be configured to recycle hydrogen sulfide from tail gas stream 224 to the sulfur recovery unit. Sulfur recovery unit 220 may generate elemental sulfur stream 222 and tail gas stream 224 from enriched acid gas stream 104 in any suitable manner. As an example, sulfur recovery unit 220 may utilize a Claus process to generate the elemental sulfur stream and the tail gas stream from the enriched acid gas stream.

FIG. 3 is a flowchart depicting methods 500, according to the present disclosure, of selectively removing hydrogen sulfide from a feed gas stream. Methods 500 include providing the feed gas stream at 510, providing a lean solvent stream at 520, and combining the feed gas stream and the lean solvent stream at 530. Methods 500 also include providing a thermal management fluid stream at 540, maintaining fluid separation at 550, and separating a mixed stream into a product gas stream and a rich solvent stream at 560. Methods 500 further include discharging a product gas stream at 570, discharging a rich solvent stream at 580, and cooling the mixed stream at 590. FIG. 3 illustrates the various steps of methods 500 sequentially. However, it is within the scope of the present disclosure that these steps may be performed in any suitable order. As an example, the providing at 510, the providing at 520, the combining at 530, the providing at 540, the maintaining at 550, the separating at 560, the discharging at 570, the discharging at 580, and/or the cooling at 590 may be performed concurrently, at least substantially concurrently, simultaneously, and/or at least substantially simultaneously. As another example, the combining at 530, the separating at 560, the discharging at 570, and/or the discharging at 580 may be responsive to and/or a result of the providing at 510 and the providing at 520. As yet another example, the cooling at 590 may be responsive to and/or a result of the combining at 530 and/or the providing at 540.

Providing the feed gas stream at 510 may include providing the feed gas stream to a mixed stream volume that is defined by an absorber-heat exchanger (ABHEX) assembly. Examples of the feed gas stream are disclosed herein with reference to feed gas stream 22 of FIGS. 1-2. Examples of the ABHEX assembly 400 are disclosed herein with reference to ABHEX assembly 400 of FIGS. 1-2. Examples of the mixed stream volume are disclosed herein with reference to mixed stream volume 402 of FIGS. 1-2.

The providing at 510 may be accomplished in any suitable manner. As an example, the providing at 510 may include providing with, via, and/or utilizing a feed gas supply system, such as feed gas supply system 20 of FIGS. 1-2. Additionally or alternatively, the providing at 510 may include providing from a hydrocarbon well, such as hydrocarbon well 36 of FIGS. 1-2.

Providing the lean solvent stream at 520 may include providing the lean solvent stream to the mixed stream volume. The lean solvent stream includes a hydrogen sulfide-absorbing solvent, and examples of the lean solvent stream are disclosed herein with reference to lean solvent stream 412 of FIGS. 1-2.

The providing at 520 may be accomplished in any suitable manner. As an example, the providing at 520 may include providing with, via, and/or utilizing a solvent regeneration assembly, such as solvent regeneration assembly 430 of FIG. 2. Additionally or alternatively, the providing at 520 may include removing, or selectively removing, at least a substantial fraction of the hydrogen sulfide from the rich solvent stream to generate a lean solvent recycle stream and providing the lean solvent recycle stream to the ABHEX assembly 400 as the lean solvent stream.

Combining the feed gas stream and the lean solvent stream at 530 may include combining, mixing, and/or fluidly contacting the feed gas stream and the lean solvent stream within the mixed stream volume and/or to produce and/or generate the mixed stream. The combining at 530 may include absorbing hydrogen sulfide from the feed gas stream within the hydrogen sulfide-absorbing solvent of the lean solvent stream, and examples of the mixed stream are disclosed herein with reference to mixed stream 401 of FIG. 2.

The combining at 530 may include flowing the feed gas stream and the lean solvent stream in fluid contact with one another. The combining at 530 additionally or alternatively may include maintaining laminar flow of the lean solvent stream within the mixed stream volume and/or while in fluid contact with the feed gas stream. The combining at 530 additionally or alternatively may include maintaining turbulent flow of the feed gas stream within the mixed stream volume and/or while in fluid contact with the lean solvent stream and/or with the hydrogen sulfide-absorbing solvent.

Providing the thermal management fluid stream at 540 may include providing the thermal management fluid stream to a thermal management fluid stream volume that is defined by the ABHEX assembly 400. The thermal management fluid stream includes a thermal management fluid, and examples of the thermal management fluid stream are disclosed herein with reference to thermal management fluid stream 466 of FIG. 2.

The providing at 540 may be accomplished in any suitable manner. As an example, the providing at 540 may include providing the thermal management fluid stream from a thermal management fluid supply system, examples of which are disclosed herein with reference to thermal management fluid supply system 460 of FIG. 2. The providing at 540 may include regulating a temperature of the thermal management fluid that is supplied to the thermal management fluid stream volume to maintain a mixed stream temperature of the mixed stream between a minimum mixed stream temperature and a maximum mixed stream temperature, examples of which are disclosed herein. The providing at 540 additionally or alternatively may include flowing the thermal management fluid stream in a closed loop that includes the ABHEX assembly 400, as discussed herein with reference to FIG. 2.

Maintaining fluid separation at 550 may include maintaining fluid separation, within the ABHEX assembly 400, between the mixed stream and the thermal management fluid stream. The maintaining at 550 may include maintaining the fluid separation with, via, and/or utilizing an isolation structure of the ABHEX assembly 400, examples of which are disclosed herein with reference to isolation structure 406 of FIG. 2.

Separating the mixed stream into the product gas stream and the rich solvent stream at 560 may include separating the mixed stream with and/or within the ABHEX assembly 400. The product gas stream may include purified hydrogen gas and carbon dioxide from the mixed gas stream, and examples of the product gas stream are disclosed herein with reference to product gas stream 42 of FIGS. 1-2. The rich solvent stream may include a substantial portion of the hydrogen sulfide and the hydrogen sulfide-absorbing solvent from the mixed stream, and examples of the rich solvent stream are disclosed herein with reference to rich solvent stream 416 of FIG. 2.

The separating at 560 may be accomplished in any suitable manner. As an example, the separating at 560 may include separating under the influence of gravity. As another example, the separating at 560 may include separating a gaseous product stream from a liquid rich solvent stream.

Discharging the product gas stream at 570 may include discharging the product gas stream from the ABHEX assembly 400. This may include discharging the product gas stream via a product gas outlet of the ABHEX assembly 400 and/or into a product gas discharge conduit of the ABHEX assembly 400.

Discharging the rich solvent stream at 580 may include discharging the rich solvent stream from the ABHEX assembly 400. This may include discharging the rich solvent stream via a rich solvent outlet of the ABHEX assembly 400 and/or into a rich solvent discharge conduit of the ABHEX assembly 400.

Cooling the mixed stream at 590 may include cooling the mixed stream with, via, and/or utilizing the thermal management fluid stream and/or with, via, and/or utilizing thermal contact between the mixed stream and the thermal management fluid stream. This may include cooling the mixed stream within the ABHEX assembly 400. The cooling at 590 may include maintaining the mixed stream temperature of the mixed stream between the minimum mixed stream temperature and the maximum mixed stream temperature, as discussed herein. The cooling at 590 additionally or alternatively may include transferring thermal energy from the mixed stream to the thermal management fluid stream.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

INDUSTRIAL APPLICABILITY

The systems and methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A selective hydrogen sulfide removal system, comprising:
   an absorber-heat exchanger (ABHEX) assembly configured to exchange thermal energy between a mixed stream and a thermal management fluid stream, wherein the ABHEX assembly:
   (i) defines a mixed stream volume configured to contain the mixed stream;
   (ii) defines a thermal management fluid stream volume configured to contain the thermal management fluid stream; and
   (iii) includes an isolation structure configured to maintain fluid separation between the mixed stream and the thermal management fluid stream and to facilitate thermal communication between the mixed stream and the thermal management fluid stream;
   a feed gas supply conduit configured to provide a feed gas stream, which includes hydrogen sulfide, carbon dioxide, and hydrocarbon gas, to the mixed stream volume;
   a lean solvent supply conduit configured to provide a lean solvent stream, which includes a hydrogen sulfide-absorbing solvent, to the mixed stream volume;
   a product gas discharge conduit configured to discharge a product gas stream, which includes purified hydrocarbon gas and carbon dioxide from the feed gas stream, from the mixed stream volume;
   a rich solvent discharge conduit configured to discharge a rich solvent stream, which includes a substantial portion of the hydrogen sulfide and the hydrogen sulfide-absorbing solvent, from the mixed stream volume;
   a thermal management fluid supply conduit configured to provide the thermal management fluid stream to the thermal management fluid stream volume; and
   a thermal management fluid discharge conduit configured to discharge the thermal management fluid stream from the thermal management fluid stream volume;
   wherein the ABHEX assembly includes a shell and tube heat exchanger that defines a shell side and a tube side, wherein the shell side defines the thermal management fluid stream volume and the tube side defines the mixed stream volume; and
   wherein the ABHEX assembly is configured to:
   (i) mix the feed gas stream and the lean solvent stream, within the mixed stream volume, to facilitate selective absorption of hydrogen sulfide by the lean solvent stream and to generate the mixed stream;
   (ii) separate the mixed stream into the product gas stream and the rich solvent stream; and
   (iii) cool the mixed stream, via heat transfer to the thermal management fluid stream, to absorb thermal energy generated upon mixing of the feed gas stream and the lean solvent stream.

2. The selective hydrogen sulfide removal system of claim 1, wherein the ABHEX assembly includes at least one turbulator configured to induce turbulent flow within the feed gas stream as the feed gas stream flows within the mixed stream volume.

3. The selective hydrogen sulfide removal system of claim 1, wherein the selective hydrogen sulfide removal system further includes a feed gas stream cooling assembly configured to cool the feed gas stream to a feed gas stream temperature prior to supply of the feed gas stream to the ABHEX assembly.

4. The selective hydrogen sulfide removal system of claim 1, wherein the selective hydrogen sulfide removal system further includes a water separation assembly configured to remove liquid water from the feed gas stream prior to supply of the feed gas stream to the ABHEX assembly.

5. The selective hydrogen sulfide removal system of claim 1, wherein the hydrogen sulfide-absorbing solvent absorbs hydrogen sulfide at a hydrogen sulfide absorption rate and absorbs carbon dioxide at a carbon dioxide absorption rate that is less than the hydrogen sulfide absorption rate.

6. The selective hydrogen sulfide removal system of claim 1, wherein the thermal management fluid supply conduit and the thermal management fluid discharge conduit are in fluid communication with a thermal management fluid supply system, and wherein the thermal management fluid supply conduit, the thermal management fluid stream volume, the thermal management discharge conduit, and the thermal management fluid supply system are configured to circulate the thermal management fluid stream in a closed loop.

7. The selective hydrogen sulfide removal system of claim 1, wherein the ABHEX assembly is configured to fluidly contact the feed gas stream with the lean solvent stream to partition at least a portion of the hydrogen sulfide from the feed gas stream into the lean solvent stream and to generate the rich solvent stream and the product gas stream, and further wherein the selective hydrogen sulfide removal system further includes:
   (i) a solvent regeneration assembly configured to separate the hydrogen sulfide from the rich solvent stream to generate an acid gas stream, which includes a substantial fraction of the hydrogen sulfide from the rich solvent stream, and a lean solvent recycle stream, which includes a substantial fraction of the hydrogen sulfide-absorbing solvent from the rich solvent stream; and
   (ii) a solvent recirculation assembly configured to provide the lean solvent recycle stream to the ABHEX assembly as the lean solvent stream.

8. The selective hydrogen sulfide removal system of claim 7, wherein the solvent recirculation assembly includes a circulation pump configured to convey the lean solvent recycle stream from the solvent regeneration assembly to the ABHEX assembly as the lean solvent stream.

9. The selective hydrogen sulfide removal system of claim 7, wherein the solvent recirculation assembly includes a filter configured to remove particulate material from at least a portion of the lean solvent recycle stream.

10. The selective hydrogen sulfide removal system of claim 7, wherein the solvent recirculation assembly includes a lean solvent cooling assembly configured to cool the lean solvent recycle stream to generate a cooled lean solvent recycle stream, which is provided to the ABHEX assembly as the lean solvent stream, wherein a cooled lean solvent recycle stream temperature of the cooled lean solvent recycle stream is less than a lean solvent recycle stream temperature of the lean solvent recycle stream.

11. The selective hydrogen sulfide removal system of claim 7, wherein the selective hydrogen sulfide removal system includes a flash vessel configured to vaporize a portion of the rich solvent stream to generate a vaporized rich solvent stream prior to supply of the rich solvent stream to the solvent regeneration assembly.

12. The selective hydrogen sulfide removal system of claim 7, wherein the selective hydrogen sulfide removal system includes a rich/lean heat exchanger configured to exchange thermal energy between the rich solvent stream and the lean solvent recycle stream.

13. The selective hydrogen sulfide removal system of claim 7, wherein the solvent regeneration assembly includes a stripping vessel.

14. The selective hydrogen sulfide removal system of claim 13, wherein the solvent regeneration assembly further includes a reboiler assembly configured to receive the lean solvent recycle stream from the stripping vessel and to vaporize at least a portion of the lean solvent recycle stream to generate a vaporized solvent return stream, wherein the stripping vessel includes a vaporized solvent return stream inlet configured to receive a portion of the vaporized solvent return stream.

15. The selective hydrogen sulfide removal system of claim 14, wherein the solvent regeneration assembly further includes a reflux system configured to return at least a portion of the acid gas stream to the stripping vessel as a reflux stream.

16. The selective hydrogen sulfide removal system of claim 15, wherein the reflux system includes:
(i) a condenser configured to condense moisture from the acid gas stream to generate a condensed water stream;
(ii) a reflux accumulator configured to accumulate at least a portion of the condensed water stream and to separate the condensed water stream from a remainder of the acid gas stream; and
(iii) a reflux pump configured to return the portion of the condensed water stream to the stripping vessel as the reflux stream.

17. A hydrocarbon gas treatment system, comprising:
the selective hydrogen sulfide removal system of claim 1;
a feed gas supply system configured to provide the feed gas stream to the feed gas supply conduit; and
an acid gas enrichment system configured to receive the acid gas stream from the selective hydrogen sulfide removal system and to separate the acid gas stream into a treated gas stream, which includes a substantial portion of the carbon dioxide from the acid gas stream, and an enriched acid gas stream, which includes a substantial portion of the hydrogen sulfide from the acid gas stream.

18. A method of selectively removing hydrogen sulfide from a feed gas stream, the method comprising:
providing the feed gas stream, which includes hydrogen sulfide, carbon dioxide, and hydrocarbon gas, to a mixed stream volume defined by an absorber-heat exchanger (ABHEX) assembly;
providing a lean solvent stream, which includes a hydrogen sulfide-absorbing solvent, to the mixed stream volume;
combining the feed gas stream and the lean solvent stream, within the mixed stream volume, to generate a mixed stream, wherein the combining includes absorbing hydrogen sulfide from the feed gas stream with the hydrogen sulfide-absorbing solvent;
providing a thermal management fluid stream, which includes a thermal management fluid, to a thermal management fluid stream volume defined by the ABHEX assembly;
maintaining fluid separation, within the ABHEX assembly, between the mixed stream and the thermal management fluid stream;
separating the mixed stream into a product gas stream, which includes purified hydrogen gas and carbon dioxide from the mixed stream, and a rich solvent stream, which includes a substantial portion of the hydrogen sulfide and the hydrogen sulfide-absorbing solvent from the mixed stream;
discharging the product gas stream from the ABHEX assembly;
discharging the rich solvent stream from the ABHEX assembly;
cooling the mixed stream within the ABHEX assembly with the thermal management fluid stream; and
circulating the thermal management fluid stream through the thermal management fluid stream volume and a thermal management fluid supply system in a closed loop.

19. The method of claim 18, wherein the providing the lean solvent stream includes removing at least a substantial fraction of the hydrogen sulfide from the rich solvent stream to generate a lean solvent recycle stream and providing the lean solvent recycle stream to the ABHEX assembly as the lean solvent stream.

20. The method of claim 18, wherein the combining includes:
maintaining laminar flow of the lean solvent stream within the mixed stream volume; and
(ii) maintaining turbulent flow of the feed gas stream within the mixed stream volume.

21. The method of claim 18, wherein the ABHEX assembly includes a shell and tube heat exchanger that defines a shell side and a tube side, wherein the shell side defines the thermal management fluid stream volume and the tube side defines the mixed stream volume.

* * * * *